(No Model.) 5 Sheets—Sheet 1.

J. P. GILL.
PROCESS OF AND APPARATUS FOR MANUFACTURING GASES AND VAPORS FOR HEATING AND ILLUMINATING PURPOSES.

No. 275,636. Patented Apr. 10, 1883.

WITNESSES
INVENTOR
Jos. Pearson Gill
ATTORNEYS (No Model.) 5 Sheets—Sheet 2.

J. P. GILL.
PROCESS OF AND APPARATUS FOR MANUFACTURING GASES AND VAPORS FOR HEATING AND ILLUMINATING PURPOSES.

No. 275,636. Patented Apr. 10, 1883.

WITNESSES
INVENTOR
ATTORNEYS.

(No Model.)
5 Sheets—Sheet 3.

J. P. GILL.
PROCESS OF AND APPARATUS FOR MANUFACTURING GASES AND VAPORS FOR HEATING AND ILLUMINATING PURPOSES.

No. 275,636. Patented Apr. 10, 1883.

WITNESSES
Joseph M Beatty
Chas. G. Hankel

INVENTOR
Jos. Pearson Gill

ATTORNEYS.

(No Model.) 5 Sheets—Sheet 4.

J. P. GILL.

PROCESS OF AND APPARATUS FOR MANUFACTURING GASES AND VAPORS FOR HEATING AND ILLUMINATING PURPOSES.

No. 275,636. Patented Apr. 10, 1883.

WITNESSES

INVENTOR

ATTORNEYS.

(No Model.)

J. P. GILL.

PROCESS OF AND APPARATUS FOR MANUFACTURING GASES AND VAPORS FOR HEATING AND ILLUMINATING PURPOSES.

No. 275,636. Patented Apr. 10, 1883.

5 Sheets—Sheet 5.

Attest:
Walter Donaldson
F. L. Middleton

Inventor:
Joseph Pearson Gill
by Ellis Spear
Attorney.

UNITED STATES PATENT OFFICE.

JOSEPH P. GILL, OF NEW YORK, N. Y.

PROCESS OF AND APPARATUS FOR MANUFACTURING GASES AND VAPORS FOR HEATING AND ILLUMINATING PURPOSES.

SPECIFICATION forming part of Letters Patent No. 275,636, dated April 10, 1883.

Application filed February 25, 1881. Renewed January 31, 1883. (No model.)

*To all whom it may concern:*

Be it known that I, JOSEPH PEARSON GILL, of the city, county, and State of New York, have invented certain new and useful Improvements in Processes of and Apparatus for the Manufacture of Gases and Vapors for Illuminating and Heating Purposes; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The nature of my invention consists in improvements in apparatus and in the method of manufacturing illuminating and non-illuminating gases and vapors for lighting and heating purposes by the automatic devices for regulating the supply of water or steam and liquid hydrocarbons to heated retorts, and in the means employed in operating the same, of which the following is a description, illustrated by the accompanying drawings, in which—

Figure 1:
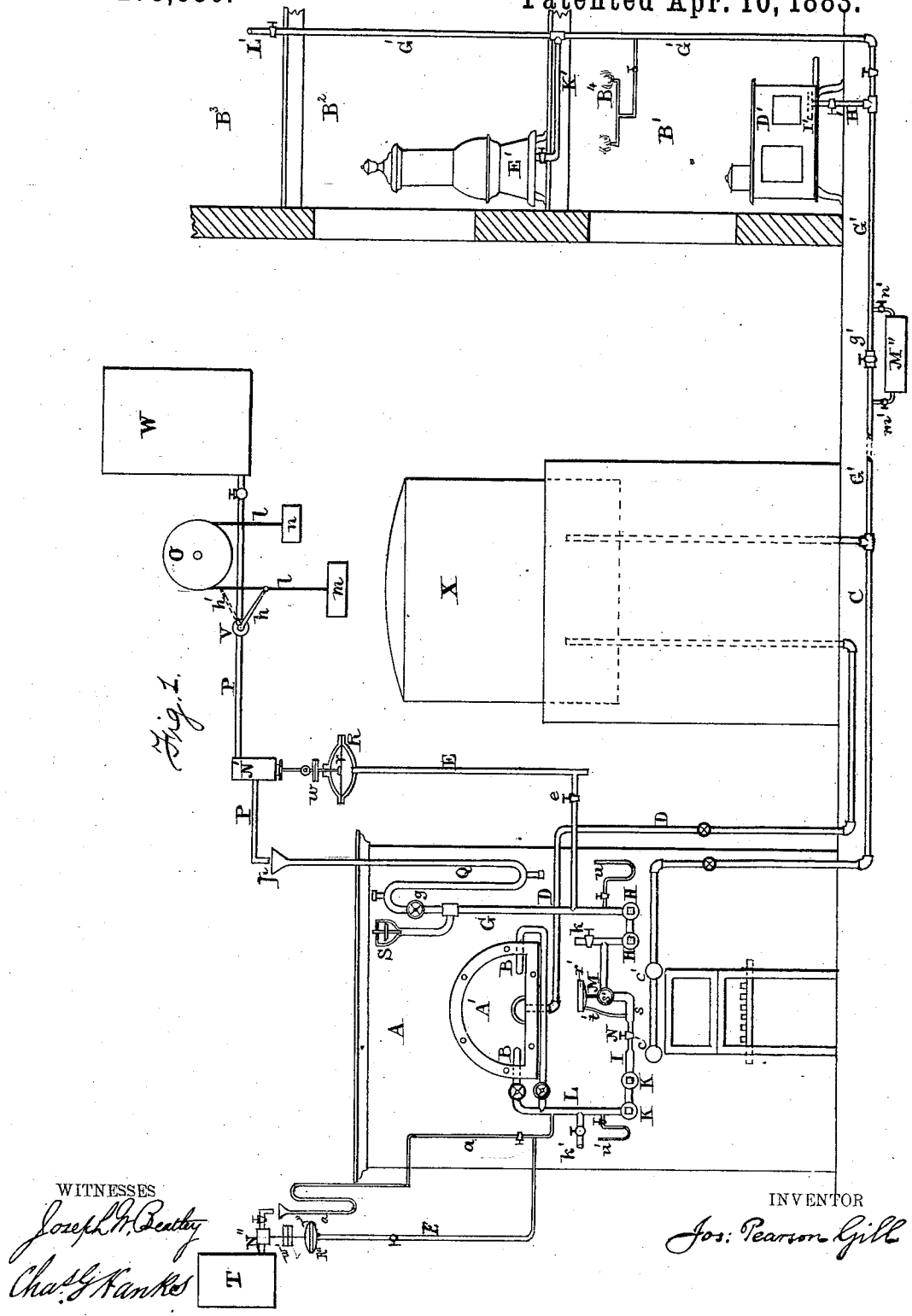
Figure 2:
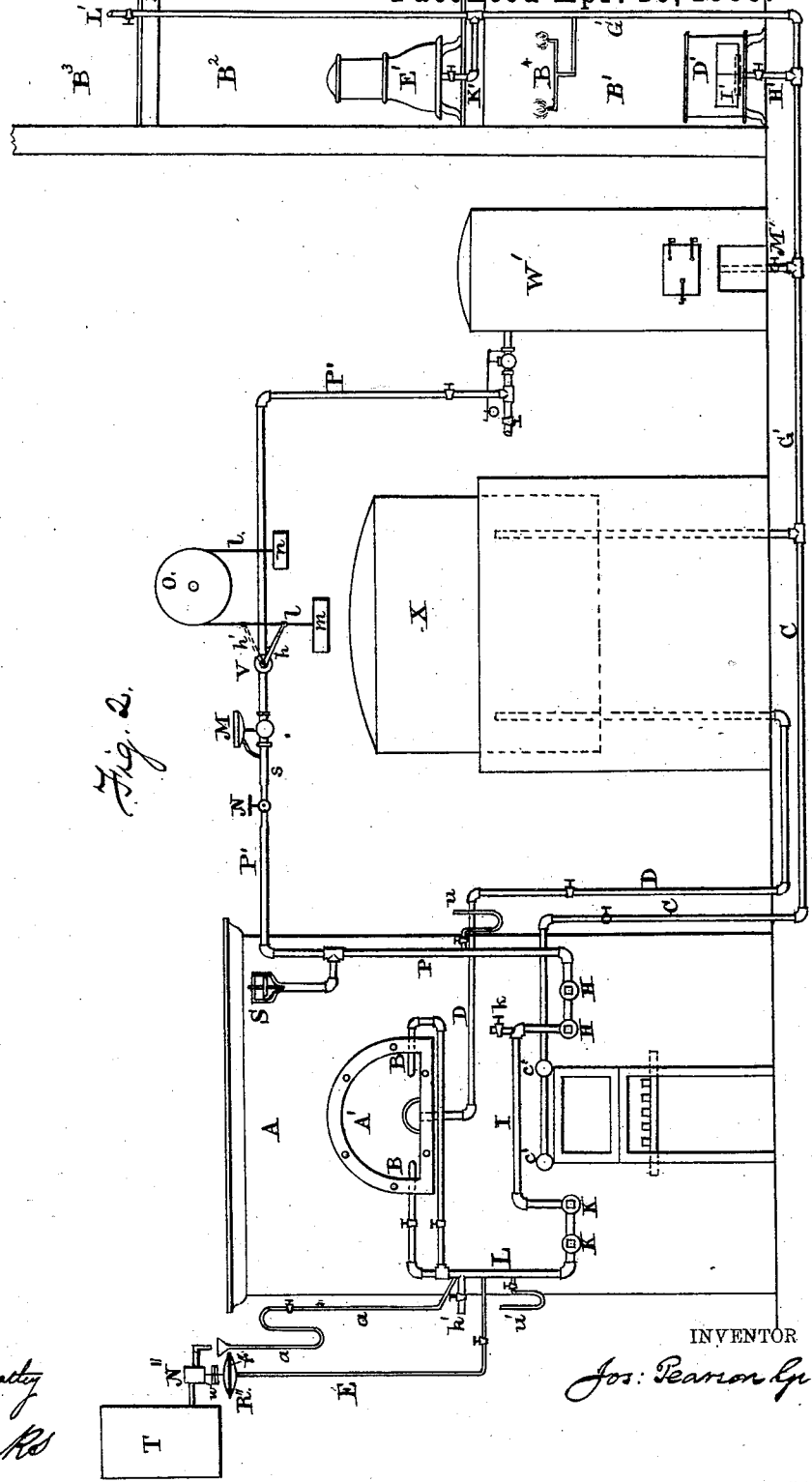
Figure 3:
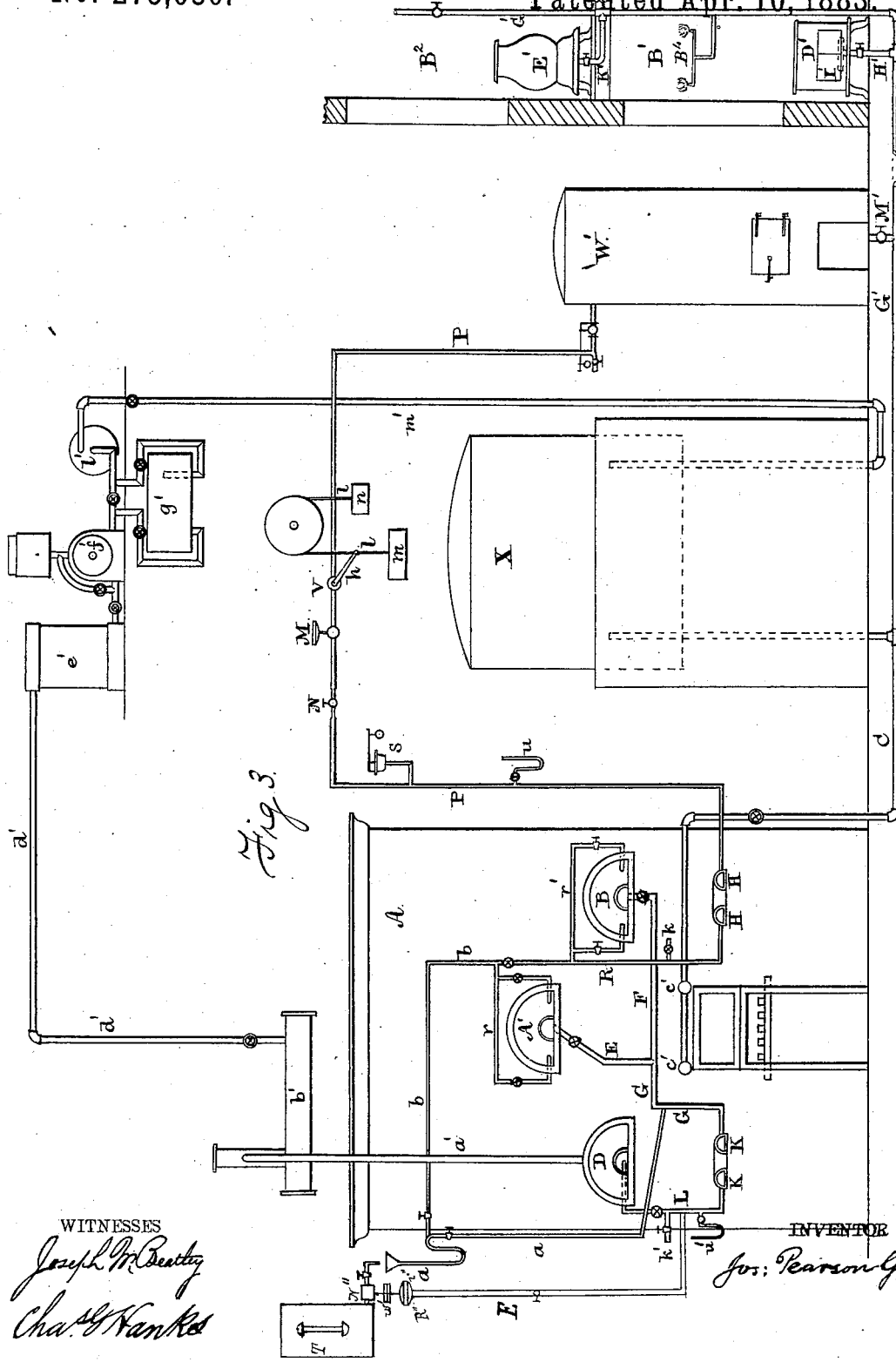
Figure 4:
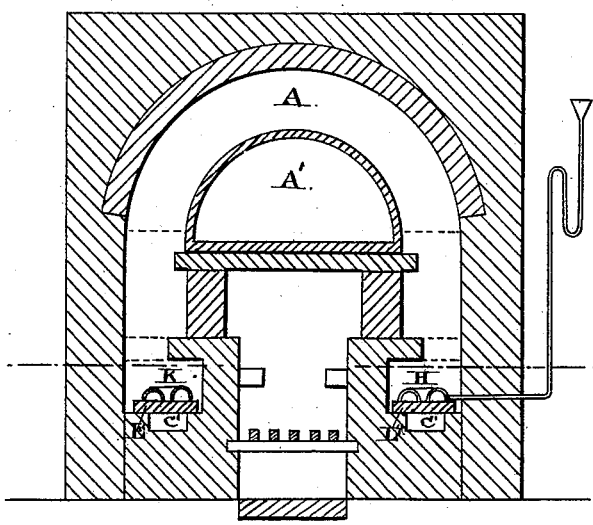
Figure 5:
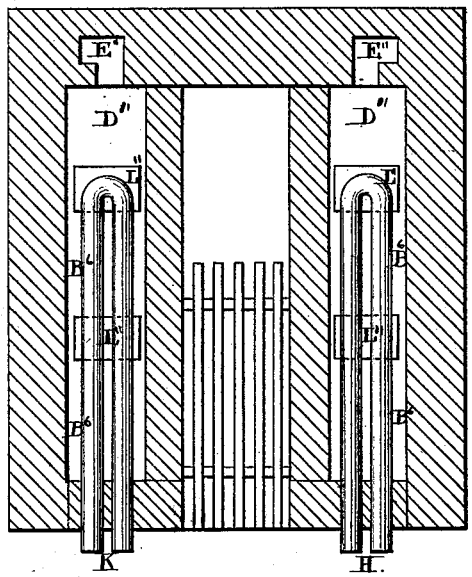
Figure 6:
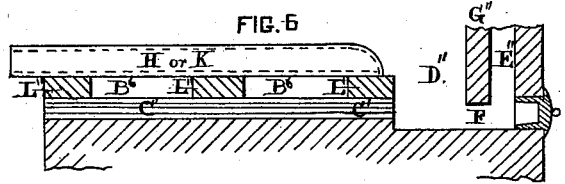
Figure 7:
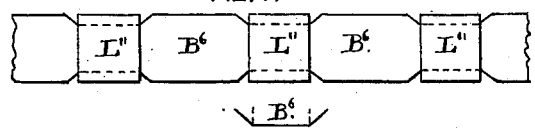
Figure 8:
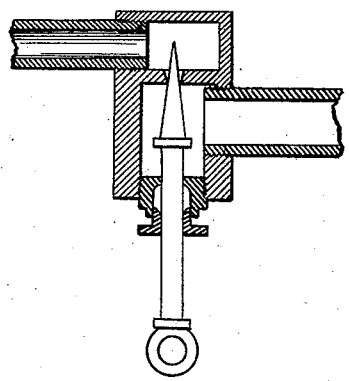
Figure 10:
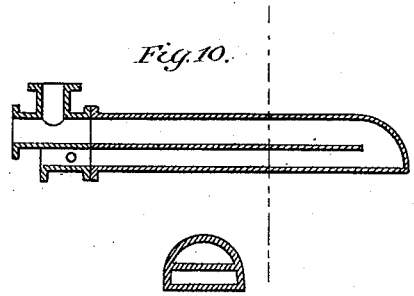
Figure 9:
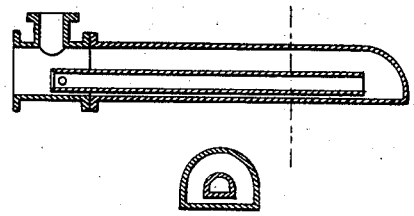
Figure 11:
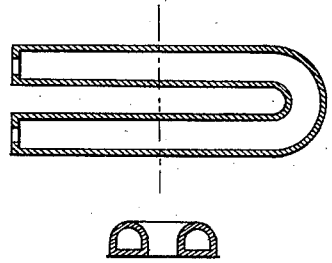

Figure 1 represents an automatic arrangement for the production of heating-gas by regulating the supply of water and of the steam generated therefrom to a superheater, and thence to a vaporizer, in which a liquid hydrocarbon is automatically delivered, the combined vapors being thence conveyed to a heated retort, and therein converted into a fixed non-illuminating gas, which, when used for domestic purposes, is conveyed by suitable connections to a holder, which, when full, automatically suspends the manufacture. Fig. 2 represents an automatic arrangement for the production of heating-gas by regulating the supply of steam from a boiler to a drier, thence to a superheater, thence to a vaporizer, in which a liquid hydrocarbon is automatically delivered, the combined vapors being thence conveyed to a heated retort, and therein converted into a fixed non-illuminating gas, which, when used for domestic purposes, is conveyed by suitable connections to a holder, which, when full, automatically suspends the manufacture. Fig. 3 represents an automatic arrangement for the production of illuminating-gas in a fixing-retort by the use of non-illuminating gas manufactured by means of an apparatus similar to that described on Sheet 2, and for which purpose, also, the apparatus described on Sheet 1 may preferably be employed when only one fire is used. Figs. 4, 5, 6, and 7 represent improvements in the construction of a gas-furnace whereby the heating-surface and capacity for gas production are increased. Figs. 8, 9, 10, and 11 represent different forms of retorts and heaters and a form of needle-valve.

In Sheet 1, A represents a furnace for the manufacture of heating-gases by the decomposition of superheated steam by the processes described in Patents No. 171,117, granted to me December 14, 1875, and No. 179,474, granted to me July 4, 1876, which apparatus, constructed as described in said patents, may be used in combination with the apparatus hereinafter described. With the furnace is used a water-pipe, P, for the admission of water in regulated quantity into the siphon-pipe Q, and thence into the U-shaped chamber or retort H H, (see Fig. 1,) for its conversion into steam, the said retort being placed in one of the lower horizontal flues of the furnace, or in such other part as may be most convenient. The steam passes through the pipe I into a second U-shaped retort, K K, where it is superheated, the superheated steam passing through the pipe L into the retort A' at the points B B, in which it is decomposed into a fixed gas by means of a solid or fluid hydrocarbon. The gas is thence conveyed by means of the pipe D D into the gas-holder X. When the liquid hydrocarbon is used a tank, as T, containing naphtha or other liquid hydrocarbon, is employed.

$a$ is a siphon and pipe to convey the liquid to the vaporizer L, where it commingles with the superheated steam, the commingled vapors passing into the heated retort at the point B.

On the water-pipe P there is a valve, V, having a lever, $h$, which is preferably attached to a line or chain, $l\ l$, passing over a wheel or pulley, O, and having on its two ends the weights $m\ n$, $m$ being the heavier. When the top of the holder is below $m$ the weight $m$ and lever $h$ are at their lowest point, and the valve V is wide open, and will then admit just the maximum quantity required by the furnace. As the holder becomes full it raises the weight $m$, and the weight $n$ falls and raises the lever $h$ to the position indicated by the dotted line $h'$, when the valve V is closed and no more water can enter the furnace until the holder descends and allows the weight $m$ to fall and the valve V to open. The pipe P has also a valve, N', to regulate the quantity of water passing through the pipe. I use preferably a needle-valve, (illustrated in Fig. 8,) where a small quantity of water is required; but any other suitable valve may be used. This valve is operated by a flexible diaphragm, $r$, in a regulator, R. (Seen in Sheet 1.) This diaphragm may be weighted by weights $w$, or by a spring, so as to give and maintain any pressure required. Steam is admitted under the diaphragm $r$ from the pipe G, which connects with the retort H, in which the steam is made, through the pipe E. If the pressure in E exceeds that fixed by the weights $w$, the diaphragm rises and partially closes the needle-valve N', and less water is admitted into the steam-generator H. If the pressure in E fall below the proper limit, the diaphragm descends and opens the needle-valve N', allowing a larger quantity of water to flow into the steam-generator. In place of the flexible diaphragm $r$, any suitable regulator may be used. The pipe G has attached to it a safety-valve, S, to permit the escape of steam when in excess. The siphon-pipe Q is of sufficient length to hold water enough to prevent the escape of steam through it. The pipes G and E have valves at $g$ and $e$. There is also a valve, $k$, on the outlet from H to permit the escape of steam when it is not required for use. There is a pressure-gage at $u$, by which the pressure in the pipe G may always be ascertained. The pipe I, connecting H with K, has a regulating reducing-valve, M, by which the pressure in the pipe at $s$ is maintained at a uniform given point, or steam is shut off in case of stoppage. The valve M has a flexible diaphragm, $r'$, under which steam is admitted from the steam-pipe $s$ through the pipe $t'$. There is also a valve on the steam-pipe at $s'$, which valve, through the action of the steam passing through the pipe $t'$ and of the diaphragm $r'$, admits the quantity of steam into $s$ to maintain the pressure therein at any point required. Instead of the diaphragm $r'$, a cylinder with a piston may be used. At N is a small valve, which will, with the pressure in $s$, admit the exact amount of steam required into the retorts. On the pipe L there is a pressure-gage, $u'$, and an outlet and a valve at $k'$ to permit the escape of steam when it is not required in the retort A'. Water is admitted into the pipe P from a reservoir, as at W, and is discharged from it at the point $p$. In the needle-shaped valve, instead of a flat circular disk to fit in the seat of the valve, as in the common globe-valve, the needle-point is used to fit in an opening of small diameter.

T is a tank containing naphtha or other hydrocarbon liquid for supplying the retort A' with vapor.

$a$ is a siphon and pipe for conveying the naphtha into the pipe and vaporizer L, where it becomes vaporized and commingled with the superheated steam.

N'' is a regulating-valve, preferably a needle-valve.

R'' is a regulator with a flexible diaphragm, $r''$, which is operated by the steam-pressure in the apparatus, the movement of which governs the movement of the valve, and thus automatically regulates the supply of naphtha to the vaporizer. The commingled superheated steam and hydrocarbon vapor thence pass into the retort A', and are therein converted into a fixed gas, which is thence conveyed to the holder X. By means of the two regulators on the water and liquid-hydrocarbon-supply pipes, each being simultaneously operated by the pressure of the steam generated from the water supplied, the relative proportion between the water and the hydrocarbon liquid, having been fixed, is automatically and invariably maintained. Whenever the use of the hydrocarbon liquid is omitted in the manufacture of non-illuminating gas the regulating device M and N, on the steam-pipe I in Sheet 1, and on the steam-pipe P in Sheet 2, or its equivalent, is attached to the water-supply pipe P, Fig. 1, the regulator being operated by means of the pressure of the water in the section of the pipe between M and N in the same manner as the steam-regulator is operated by the pressure of the steam. In place of the U-shaped retorts H K, as further shown in Fig. 11, a small pipe inside of a large one, or a D-shaped retort with a pipe in it for an outlet, as in Fig. 9, or a double retort, as Fig. 11, or any kind of superheating apparatus, may be used, which may be put in any convenient place or places in the bench. When the U-shaped retorts H K, or other retorts or superheating apparatus, are placed in the lower horizontal flues of the furnace, as in Sheet 1, the flues are constructed in the following manner, as shown in Figs. 4, 5, 6, and 7, in order to heat them more effectually.

The same letters refer to similar parts.

L'' represents fire-clay blocks, upon which the retort rests; B$^6$, the spaces between them for the circulation of the draft; C', a longitudinal flue under the blocks L'' and opening into the space D'' next to the rear wall of the bench; E'', the uptake or escape-flue of the bench; F, the inlet to the uptake; G'', the brick wall between the uptake and the space D'', which is carried below the bottom of the blocks L'' to compel the circulation of the heat through the the flues B$^6$ C' before it escapes into the uptake E''. C' is narrowed under the blocks L'' to form a support for the blocks, as in Fig. 7. Between the blocks L'' the sides of the flue are made sloping, as in Fig. 8. This arrangement prevents the accumulation of ashes or dust, and enables the flue C' to be readily cleaned out through a stopper in front of the bench.

In Fig. 2, W' represents a boiler, and P' a steam-pipe, connecting the boiler with the driers H H in the furnace A. The holder X, valve v, lever h, cord or chain l, weights m n are used in the same manner when steam from a boiler is employed in the production of gas as when water is employed, as heretofore described, and as illustrated on Sheet 1. The pipe P' has a regulating reducing-valve, M, for the purpose of maintaining a uniform given pressure in the section S of the pipe P'.

At N there is a small valve, the opening of which is just large enough, with a given pressure in the section s, to pass the maximum quantity of steam that can be decomposed in the retort A'.

At u and u' are pressure-gages, by which the pressure of the steam in the pipes P' L, Fig. 2, may always be known. At S is a safety-valve. The U-retort H H in this case is used for drying the steam before it passes into the superheater K K.

T is a tank containing hydrocarbon liquid for supplying the retort A' with vapor in the same manner and by the same automatic device as set forth in the description of Sheet 1.

By means of the two regulators on the steam and liquid-hydrocarbon-supply pipes, each being operated by the pressure of the steam supplied, the relative proportion of the steam and the hydrocarbon liquid, having been fixed, is automatically and invariably maintained.

When an illuminating-gas or a vapor for lighting and heating is made from a hydrocarbon liquid without the use of steam, the flexible diaphragm r'' in the regulator R'' on the supply-pipe or an equivalent device is operated by the pressure in the vaporizer or retort, and thus the supply of the liquid is automatically regulated and maintained.

The remainder of the apparatus shown in Fig. 2 is in duplicate of that in Fig. 1.

The apparatus illustrated in Fig. 3 is similar in construction and use to that hereinbefore described, and illustrated in Fig. 2, with the exception of the arrangement of the furnace A, in which is shown a supplemental retort and apparatus for supplying an additional increment of hydrocarbon vapor to the gas after it has been fixed in retorts and apparatus such as has been previously described. The construction of the apparatus will be understood from an inspection of the drawings, Fig. 3, and from the description of the operation, which is as follows, viz: the steam passes through the pipe P into the superheater H, thence through the pipes R r r', together with the hydrocarbon liquid coming through the pipe b from the tank T, into the retorts A' B, where they are decomposed into a fixed gas, which passes through the pipes E and F to the pipe G, in which it meets the liquid hydrocarbon coming through the pipe a from the tank T, and the gas combining with the liquid passing into the vaporizer K, and thence through the pipe L into the retort D, in which a fixed illuminating-gas is made. Instead of a fluid, a solid hydrocarbon—such as anthracite coal or a similar substance—may be used in the retorts A' and B. By this combination one fire is made to do all the work, the superheaters, non-illuminating-gas retorts, vaporizers, and carbureting-retorts being in one furnace. The water-reservoir, water-supply pipe, and regulating apparatus, and the steam-generator, as illustrated in Fig. 1, may be used instead of the boiler, steam-supply pipe, and steam-regulating apparatus, as illustrated in Fig. 3. The gas from the retort D may pass through the stand-pipe a', hydraulic main b', connecting-pipe d', condenser e', exhauster f', purifiers g', meter l', pipe m', to the holder X.

The furnace A, in Figs. 1, 2, 3, may be heated with gas brought from the holder X by means of the pipe C and branches thereof, c' c', leading into the fire-box. The gas from the holder X may also be conveyed through the pipe G' to the boiler W', the stoves, and ranges in the rooms B' B² B³, and to the burners B⁴ for lighting.

M' is a branch pipe leading to the fire-box of the boiler.

H' is a branch pipe leading to a burner for heating, as at I', in a kitchen-range, D'.

K' is a branch pipe leading to a stove, E', in the room B².

From the point L' the pipe G' may be extended to any furnace or fire-place.

In order to increase or give an illuminating-power to the gas, or to produce modified temperatures in the use of non-illuminating gas for heating purposes, the gas may be passed through a carburetor containing a volatile liquid hydrocarbon, as at M'' in Fig. 1.

What I claim, and desire to secure by Letters Patent, is—

1. In combination, in an apparatus for manufacturing gas, a retort, an automatically-regulated steam supply apparatus connected to said retort, a superheater, a vaporizer connected to the steam-supply; a pipe for conducting the liquid hydrocarbon to said vaporizer, and a regulating device for the hydrocarbon-supply connected to said vaporizer or its immediate connections, whereby the supply of hydrocarbon is made to vary with the variations of the steam-supply, as set forth.

2. In combination, in a gas-manufacturing apparatus, a steam-supply pipe provided with an automatic regulating device, a superheater, a hydrocarbon-liquid-supply pipe, provided also with an automatic regulating device, a vaporizer, and a retort or retorts for fixing the vapors and steam, and a supplemental retort and hydrocarbon-supply for supplying additional vapor and fixing it with said gas, substantially as described.

3. In an apparatus for manufacturing gas, the combination, as herein described, of a supply-pipe for water, provided with an automatic regulating device connected by a pipe to the steam-generator, whereby the supply of water is regulated by the pressure of the steam generated from the water thus supplied, a steam-generator in the furnace connected with said water-supply pipe, a steam-pipe provided with an automatic regulating device connecting said steam-generator to a superheater, whereby the supply of water and steam is automatically regulated by the amount of steam generated in the furnace and consumed in the retort, as set forth.

4. The combination, as herein described, in a gas-making apparatus having a retort and suitable steam-supply pipe, of a hydrocarbon-liquid-supply pipe, a regulating device within said supply-pipe, and a pipe connecting said regulating device to the steam within the apparatus, whereby the supply of hydrocarbon is regulated by the supply of the steam, as set forth.

5. In a gas-manufacturing apparatus, the combination, as herein described, of a steam-generator, a superheater within the bench, steam-pipes between said generator and superheater, and an automatic regulating or reducing mechanism, substantially as described, between said generator and superheater, whereby a uniform supply of steam is made, as set forth.

6. The combination, as herein described, for the automatic regulation of the relative quantities of the water and hydrocarbon liquid supplied, of a water-supply pipe, P, provided with an automatic regulating device, R N', a steam-generator, H H, and a hydrocarbon-liquid-supply pipe, $a$, provided with an automatic regulating device, R'' N'', both regulators being simultaneously operated by the pressure through the pipes E E' of the steam-generator from the water supplied to the generator H H, substantially in the manner herein described and set forth.

7. In an apparatus for the automatic production of gas by the direct and regulated delivery of water to a generator in a furnace, and of a hydrocarbon liquid to a vaporizer in a furnace, the combination of a reservoir, W, water-supply pipe P, valve V, weights $m$ $n$ and their connections, regulator N' R, trap-pipe Q, safety-valve S, steam-generator H, regulator M, valve N, superheater K, vaporizer L, tank T, regulator N'' R'', trap-pipe $a$, retort A', and holder X, connected and constructed substantially in the manner herein described, and for the purpose set forth.

8. In an apparatus for the automatic production of gas by the direct and regulated delivery of water to a generator in a furnace, the combination of a water-supply pipe, P, regulator N' R, trap-pipe Q, safety-valve S, steam-generator H, regulator M, valve N, superheater K, vaporizer L, tank T, regulator N'' R'', trap-pipe $a$, and retort A', connected and constructed substantially in the manner herein described, and for the purpose set forth.

9. In an apparatus for the automatic production of gas by the direct and regulated delivery of water to a generator in a furnace, the combination of a water-supply-pipe, P, regulator N' R, trap-pipe Q, safety-valve S, steam-generator H, regulator M, valve N, superheater K, and retort A', connected and constructed substantially in the manner herein described, and for the purpose set forth.

10. In an apparatus for the automatically-regulated delivery of water to a steam-generator, the combination of a water-supply pipe, P, regulator N' R, trap-pipe Q, safety-valve S, and steam-generator H, connected and constructed substantially in the manner herein described, and for the purpose set forth.

11. In an apparatus for the manufacture of gas by the automatic delivery of steam to a superheater, and of a hydrocarbon liquid to a vaporizer in a furnace, the combination of superheaters H H, steam and oil supply pipes, non-illuminating-gas retorts A' B, vaporizers K K, and a fixing or illuminating gas retort, D, connected and constructed substantially in the manner herein described, and for the purpose set forth.

12. In an apparatus for the manufacture of gas by the automatic delivery of water to a generator in a furnace, and of a hydrocarbon liquid to a vaporizer in a furnace, the combination of a steam generator or superheater, H H, non-illuminating-gas retorts A' B, vaporizers K K, and a fixing or illuminating gas retort, D, connected and constructed substantially in the manner herein described, and for the purpose set forth.

13. In a furnace for the manufacture of gas, the combination of blocks L, flues C $D^2$ $E^2$ F, and division-wall G'', whereby the productive capacity of the furnace is increased, constructed substantially in the manner herein described, and for the purpose set forth.

In testimony that I claim the foregoing as my own I affix my signature in presence of two witnesses.

JOSEPH PEARSON GILL.

Witnesses:
JOSEPH W. BEATLEY,
CHAS. G. WAUKS.